United States Patent [19]

Wallach

[11] Patent Number: 5,234,252

[45] Date of Patent: Aug. 10, 1993

[54] ADJUSTABLE SEAT COVER

[75] Inventor: Stewart Wallach, Boca Raton, Fla.

[73] Assignee: Sagaz Industries, Inc., Miami, Fla.

[21] Appl. No.: 778,524

[22] Filed: Oct. 18, 1991

[51] Int. Cl.⁵ .......................................... A47C 31/11
[52] U.S. Cl. ...................................... 297/229; 297/220; 297/228.1
[58] Field of Search ............... 297/219, 220, 224, 225, 297/229

[56] References Cited

U.S. PATENT DOCUMENTS

| 1,889,662 | 11/1932 | Hyman | 297/229 X |
| 2,469,520 | 5/1949 | Roberts, Jr. | 297/225 |
| 4,232,898 | 11/1980 | Bodrero | 297/224 |
| 4,669,779 | 6/1987 | Kagana et al. | 297/224 X |
| 5,023,125 | 6/1991 | Gray | 297/219 X |

Primary Examiner—Peter R. Brown
Attorney, Agent, or Firm—Reising, Ethington, Barnard, Perry & Milton

[57] ABSTRACT

An adjustable seat cover (10) for a vehicular bucket seat. The seat cover (10) comprises a backrest envelope (12) for covering a seat backrest (18) including an elastic section (42) for allowing the backrest envelope (12) to conform to seats of varying size. A seat bottom envelope (64) for covering a seat bottom (56) is attached to the backrest envelope (12) and includes elastic retaining bands (82) to create a snug fit across the seat bottom (56). Adjustment straps (46) are attached to the backrest envelope (12) and securely tighten the backrest envelope (12) around the headrest (28) and other areas of sharply varying width contour in the backrest (18). The adjustment straps (46) are adjustably connected together with hook and loop retainers (52) attached to the adjustment straps (46).

17 Claims, 3 Drawing Sheets

ADJUSTABLE SEAT COVER

TECHNICAL FIELD

The subject invention relates to seat covers and more particularly to an adjustable seat cover for covering vehicular bucket seats of varying type, shape and size.

BACKGROUND ART

Seat covers have been a popular item for a number of years and have been used extensively in covering vehicular seats. They are an inexpensive and easy way to hide damaged or unattractive seat upholstery and can also provide added cushioning to the seat.

Vehicular seats currently come in a variety of sizes and shapes. These include highback seats, lowback seats and seats with and without headrests. Highback seats, as the name implies, have a longer and narrower backrest portion than lowback seats. Headrests are often attached to the top of the backrests and are generally of a smaller width than the backrest. This creates a wide shoulder area of the backrest adjacent the narrower bottom of the headrest. The top of the headrest and the shoulders of the backrest thus form high points in the contour of the backrest with the area at the base of the headrest forming a valley. A universal seat cover which can conform to the variations in seat types is thus highly desirable. However, due to the wide range of sizes of vehicular seats a universal seat cover is very difficult to design.

Without a universal seat cover, merchants must stock a large variety of seat covers to accomodate a number of different seat styles. This is both costly and inefficient for the merchant as well as the manufacturer. In addition, if a consumer attempts to use a seat cover that is not specifically designed for his seat problems will arise with the fit and appearance of the seat cover. A seat cover that is too large will create a baggy fit of the seat cover, whereas a seat cover that is too small will not fully cover a large seat leaving portions of the seat exposed. This will create a very unattractive and unsatisfactory appearance of the seat cover.

Currently, semi-universal seat covers are known that can adapt to seats of either the highback or lowback variety. U.S. Pat. No. 4,669,779 to Kaganas et al illustrates an adjustable seat cover of this type. The seat cover includes a backrest envelope having an elastic panel to give the backrest envelope the ability to change shape to conform to the backrest of either a highback or lowback seat. A major deficiency in this system is that the backrest envelope of the seat cover cannot fully conform to a seat with a headrest. The valley at the base of the headrest between the high points of the top of the headrest and the shoulders of the backrest creates a baggy portion of the seat cover in this area and a very unattractive appearance.

In addition, U.S. Pat. No. 4,676,549 to English shows an adjustable backrest envelope for a seat cover that can conform to both highback and lowback seat backrests. This seat cover utilizes an elastic cap portion as well as an elastic back panel to permit adjustment to various sized seats. This seat cover, however, has the same deficiency of not having the ability to fully conform to the valleys between the spaced high points formed by the shoulders of the backrest and the top of the headrest.

SUMMARY OF THE INVENTION AND ADVANTAGES

The present invention provides a seat cover for adjustably covering a vehicular seat backrest having sharply varying width contours defining spaced high points with valleys therebetween. The seat cover comprises a backrest envelope having an open bottom end and a closed top end for receiving the backrest through the open bottom end and enveloping the backrest with portions thereof bridging the valleys between the high points. The present invention is characterized by manual adjustment means spaced between said top and bottom ends for pulling the portions of the backrest envelope that bridge the valleys between the high points to snugly fit and conform the seat cover into the valleys of the backrest.

The adjustment means of the present invention eliminates the loose fit of the seat cover around the area of the seat between the bottom of the headrest and the shoulder portion of the backrest. The seat cover is simply pulled tight in this area of sharply decreasing width to create a perfectly conforming cover about the seat backrest. This is distinguished from the prior art which would create a baggy portion of the seat cover in this same headrest area of the seat backrest. Thus, the subject seat cover is fully universal to cover a variety of seat styles not possible with the prior art.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
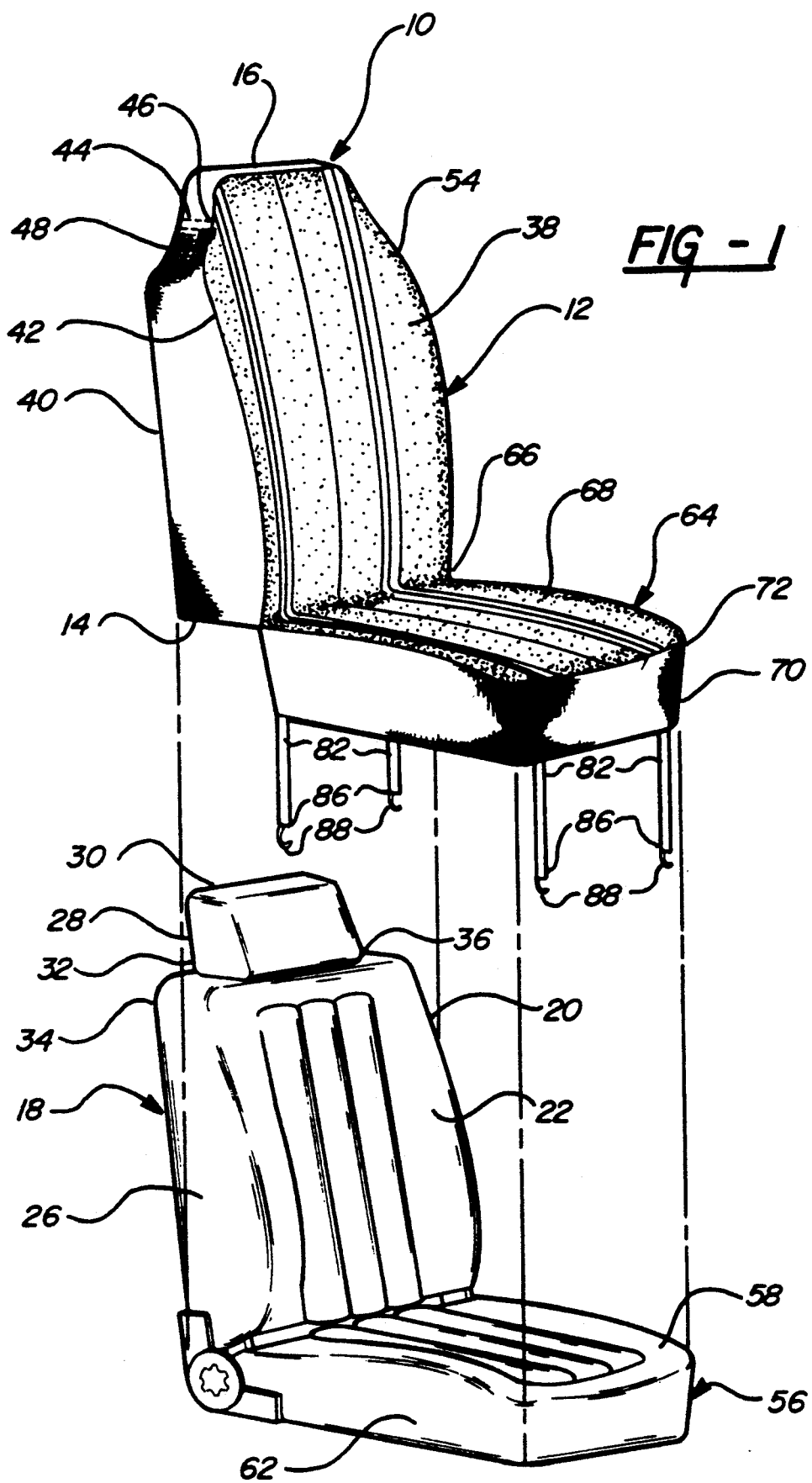
FIG. 1 is an exploded front perspective view of a seat cover constructed in accordance with the present invention above a highback bucket seat including a headrest.
Figure 2:
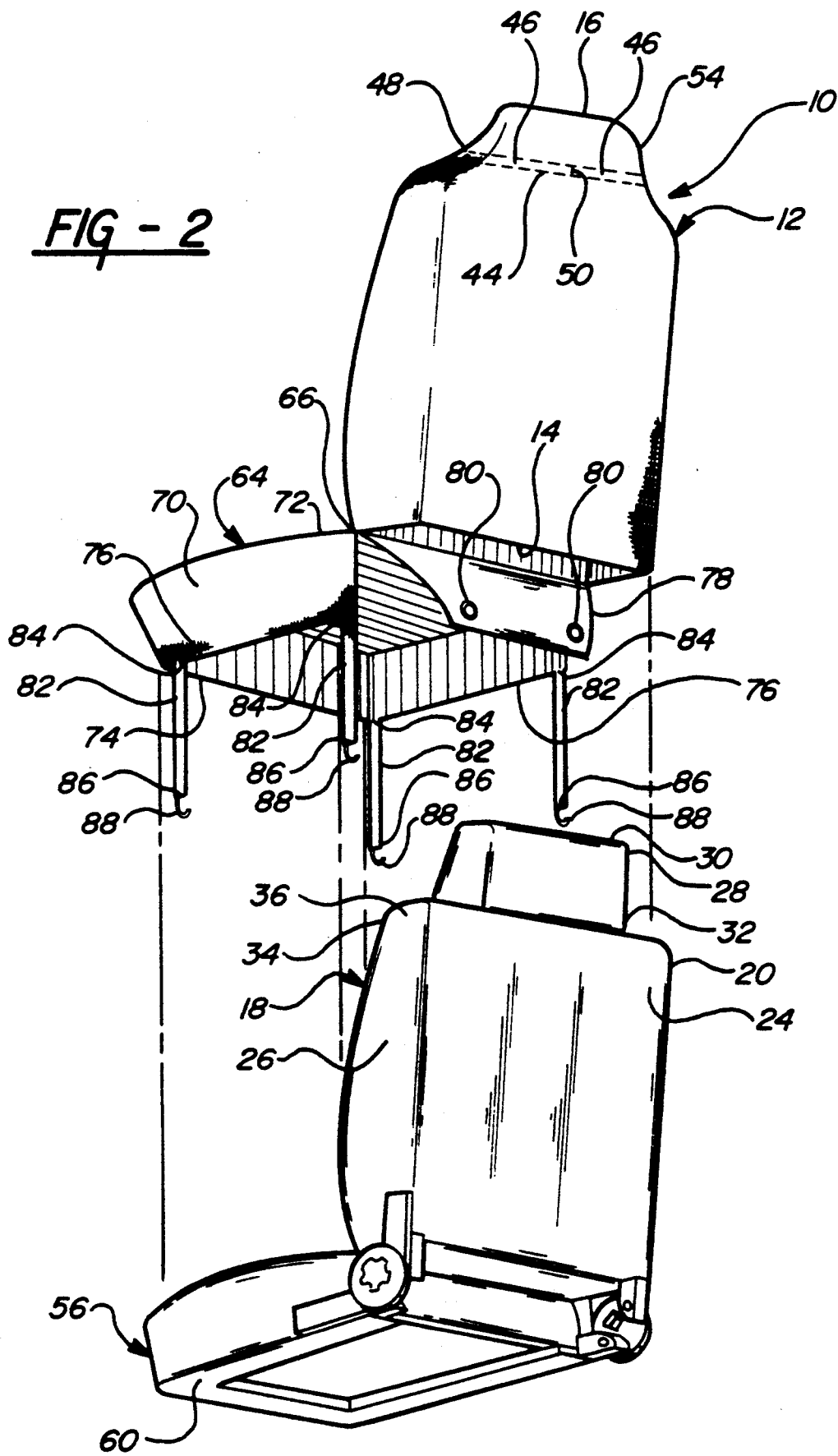
FIG. 2 is a rear perspective view of the seat and seat cover of FIG. 1.
Figure 3:
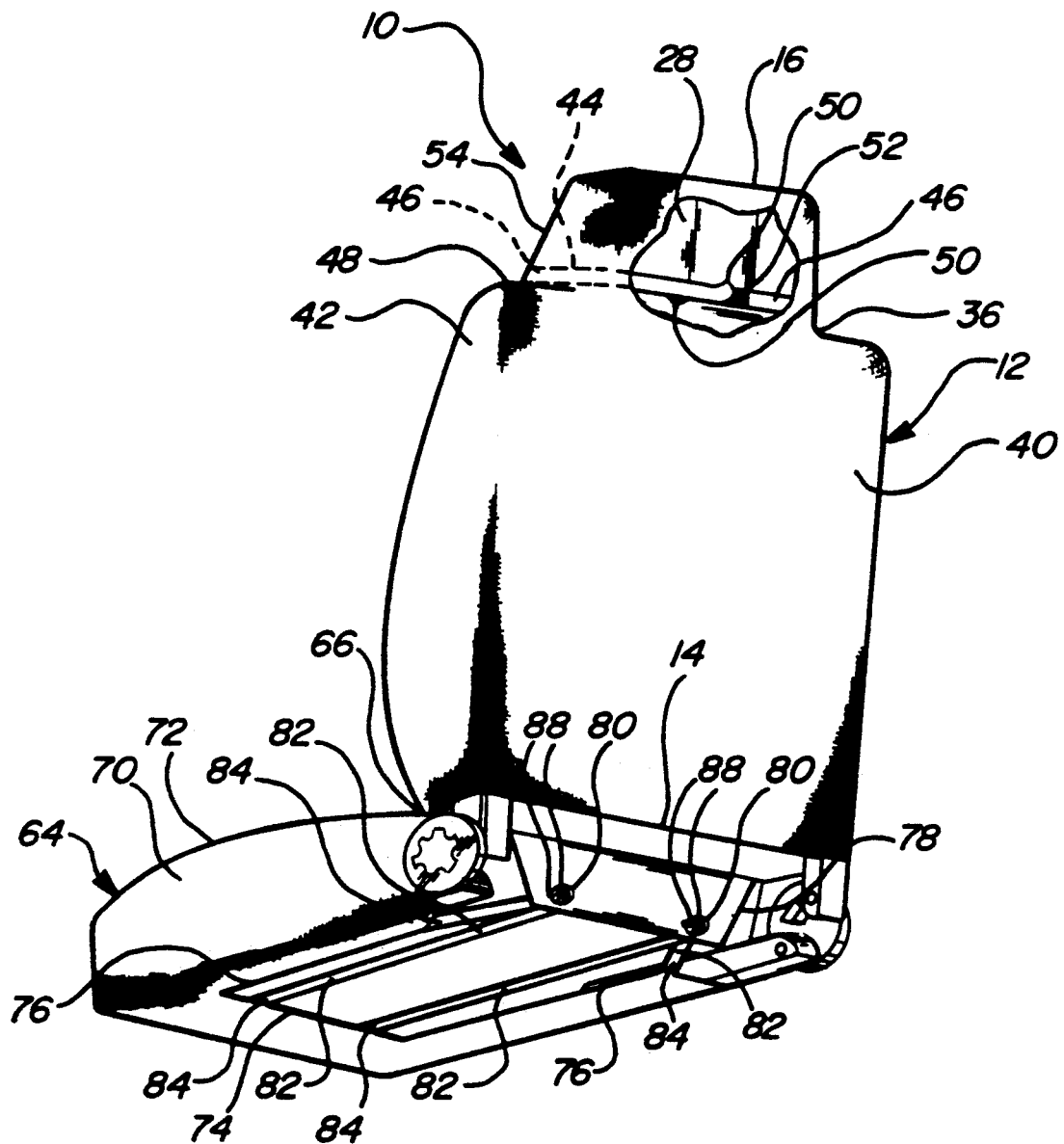
FIG. 3 is a rear perspective view of the seat cover of the present invention disposed upon a highback bucket seat including a headrest illustrating a cut-away view of the adjustment means.

A seat cover for adjustably covering a vehicular seat backrest having sharply varying width contours defining spaced high points with valleys therebetween is generally shown at 10 in FIG. 1.

The seat cover 10 includes a backrest envelope 12 with an open bottom end 14 and a closed top end 16 for receiving a vehicular seat backrest 18 through the open bottom end 14. The vehicular seat backrest 18 includes a top portion 20, a front portion 22 and a rear portion 24. A side portion 26 is disposed between the front 22 and rear 24 portions of the backrest 18. The vehicular seat backrest 18 further includes a headrest 28 including a top 30 and a bottom 32. The headrest 28 is of a smaller width than the remainder of the backrest 18 forming a wide shoulder area 34 adjacent the headrest bottom 32. This creates a valley 36 between the highpoints in the width contour formed by the headrest top 30 and the shoulder portion 34 of the backrest 18. The backrest envelope 12 envelopes the backrest 18 and bridges the valleys 36 in the backrest 18.

The backrest envelope 12 further includes a substantially non-expandable fabric panel 38 attached to an expandable elastic section 40 along a first common seam 42. The flexibility of the elastic section 40 allows the seat cover 10 to stretch and conform to nearly any style of backrest 18. The fabric panel 38 is oriented to cover the front 22 of the backrest 18 while the elastic section 40 covers the rear 24. The first common seam 42 thus extends along the sides 26 of the backrest 18 from the open bottom end 14 of the backrest envelope 12 upwardly to the closed top end 16 and thence downwardly to the open bottom end 14.

The present invention is characterized by a manual adjustment means 44 spaced from the top end 16 of the backrest envelope 12 for pulling portions of the backrest envelope 12 to fit and conform to the valleys 36 in the backrest 18. This eliminates the loose fit that would be caused by the inability of the backrest envelope 12 to adjust to such a sharp decrease in width of the backrest 18.

The adjustment means 44 of the preferred embodiment is in the form of first and second adjustment straps 46 including fixed ends 48 and free ends 50. The fixed ends 48 are attached at spaced locations along the first common seam 42 of the backrest envelope 12 adjacent valleys 36 in the backrest 18. The free ends 50 are adjustably connected together across the backrest envelope 12 by a hook and loop retaining assembly 52. The backrest envelope 12 further includes an inside and an outside surface, with the adjustment means 44 disposed adjacent the inside surface of the backrest envelope 12.

While the preferred embodiment utilizes adjustment straps 46 with a hook and loop retaining assembly 52 for the adjustment means 44, any type of adjustment means 44 would be effective. This would include straps 46 using buckles, snaps, hooks, knots, adhesive, or any other type of attachment to affix the adjustment straps 46 adjustably together. In addition, the adjustment means 44 is not limited to a single set of straps but could be a plurality of straps. Furthermore, the adjustment means 44 is not limited to straps 46 but could be another shape or inherent in the seat cover 10 itself as long as selective adjustment of the seat cover 10 is permitted.

The backrest envelope 12 further includes a section of gradually decreasing width 54 adjacent the closed top end 16. This helps the backrest envelope 12 conform to the headrest 28 of the backrest 18 as there is less fabric to require adjustment. However, this does not prevent the backrest envelope 12 from covering a backrest 18 without a headrest 28 as the section of decreasing width 54 is still stretchable to cover a wide backrest 18.

A seat bottom 56 is attached to the backrest 18 and includes a top surface 58, an underside 60 and side edges 62. A seat bottom envelope 64 covers the seat bottom 56 and is attached to the backrest envelope 12 along a second common seam 66. The seat bottom envelope 64 comprises a substantially non-expandable fabric panel 68 attached to an expandable elastic skirt 70 along a third common seam 72. The elastic skirt includes a front edge 74 and side edges 76. The fabric panel 68 covers the top surface 58 of the seat bottom 56 while the elastic skirt 70 covers the side edges 62. Thus, the backrest envelope 12 and seat bottom envelope 64 are oriented such that the fabric section 38 of the backrest envelope 12 and the fabric section 68 of the seat bottom envelope 64 are adjacent one another.

A trapezoidal panel 78 is attached to the second seam 66 joining the backrest envelope 12 and the seat bottom envelope 64. The trapezoidal panel 78 is made of leather or other flexible material and includes two reinforced rings 80.

A retaining means 82 is attached at first ends 84 to the seat bottom envelope 64 at the edge of the elastic skirt 70. The retaining means 82 of the preferred embodiment comprises elastic retaining bands with distal ends 86 at which hooks 88 are disposed. The elastic retaining bands are attached to the elastic skirt 70 along the front edge 74 and side edges 76 of the elastic skirt 70. The hooks 88 are further disposed in the reinforced rings 80 of the trapezoidal panel 78. The retaining means 82 pulls the trapezoidal panel 78 downwardly and toward the front edge 74 of the elastic skirt 70 and also pulls the side edges 76 together. This pulls the fabric panel 68 taut across the top surface 58 of the seat bottom 56 to create a better fit of the seat bottom envelope 64 across the seat bottom 56.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A seat cover (10) for adjustably covering a vehicular seat backrest (18) of the type having a relatively broad base portion (20) extending upwardly from a seat portion (56) and a relatively narrow or reduced width headrest portion (28) extending upwardly from the top edge of the base portion (20), whereby a valley section (36) is formed between the top outer edges (30) of the headrest portion (28) and the top outer edges (34) of the base portion (20), said seat cover (10) comprising:

a backrest envelope (12) having an open bottom end (14) and a closed top end (16) for receiving the backrest (18) through said open bottom end (14) and enveloping the bracket (18) with bridging portions thereof for suspension across the valleys (36) on the backrest (18);

and characterized by manual adjustment means (44) attached to said bridging portions for pulling said bridging portions of said backrest envelope (12) to snugly fit and conform said seat cover (10) into the valleys (36) between the top outer edges (30) of the headrest portion (28) and the top outer edges (34) of the backrest (18).

2. A seat cover (10) as set forth in claim 1 further characterized by said adjustment means (44) comprising a first strap (46).

3. A seat cover (10) as set forth in claim 2 further characterized by said backrest envelope (12) comprising a substantially non-expandable fabric panel (38) attached to an expandable elastic section (40) along a first common seam (42) extending from said bottom end (14) upwardly toward said top end (16) and thence downwardly again to said bottom end (14) of said backrest envelope (12).

4. A seat cover (10) as set forth in claim 3 further characterized by said adjustment means (44) including a second strap (46), and said first and second straps (46) each including a fixed end (48) attached to said backrest envelope (12) at spaced locations along said first common seam (42) and a free end (50) extending from said respective fixed ends (48).

5. A seat cover (10) as set forth in claim 4 further characterized by said free ends (50) of said first and second straps (46) including hook and loop retainers (52).

6. A seat cover (10) as set forth in claim 3 further characterized by a seat bottom envelope (64) attached to said backrest envelope (12) along a second common seam (66) for containing the seat bottom (56).

7. A seat cover (10) as set forth in claim 6 further characterized by said seat bottom envelope (64) comprising a substantially non-expandable fabric panel (68) attached to an expandable elastic skirt (70) along a third common seam (72).

8. A seat cover (10) as set forth in claim 7 further characterized by trapezoidal panel (78) attached to said second common seam (66) joining said backrest envelope (12) and said seat bottom envelope (64).

9. A seat cover (10) as set forth in claim 8 further characterized by retaining means (82) attached to said seat bottom envelope (64) for stretching said seat bottom envelope (64) taut across the seat bottom (56).

10. A seat cover (10) as set forth in claim 9 further characterized by said elastic skirt (70) including a front section (74) disposed opposite said trapezoidal panel (78) and two side sections (76), said retaining means (82) drawing said side sections (76) together and drawing said trapezoidal panel (78) toward said front section (74).

11. A seat cover (10) as set forth in claim 10 further characterized by said retaining means (82) comprising a plurality of elastic bands with first ends (84) attached to said elastic skirt (70) and distal ends (86) each supporting a hook (88).

12. A seat cover (10) as set forth in claim 5 wherein said backrest envelope (12) includes an inside surface and an outside surface, further characterized by said adjustment means (44) disposed on said inside surface of said backrest envelope (12).

13. A seat cover (10) as set forth in claim 1 further characterized by said backrest envelope (12) having a section of gradually decreasing width (54) adjacent said top end (16).

14. A seat cover (10) assembly comprising;
a vehicular seat backrest (18) having a relatively broad base portion (20) extending upwardly from a seat portion (56) and a relatively narrow or reduced width headrest portion (28) extending upwardly from the top edge of the base portion (20), whereby a valley section (36) is formed between the top outer edges (30) of the headrest portion (28) and the top outer edges (34) of the base portion (20)
a backrest envelope enveloping said backrest (18);
said backrest envelope (12) having an open bottom end (14) and a closed top end (16) for receiving said backrest (18) through said open bottom end (14);
said backrest envelope (12) enveloping said backrest (18) with bridging portions thereof suspended across said valleys (36);
and characterized by manual adjustment means (44) attached to said bridging portions adjacent said valley (36) on said backrest (18) for pulling said bridging portions of said backrest envelope (12) to snugly fit and conform said seat cover (10) into said valleys (36) of said backrest (18).

15. A seat cover (10) as set forth in claim 14 further characterized by said backrest (18) including a top (20) end with a headrest (28) disposed at said top end (20).

16. A method for adjustably covering a vehicular seat backrest (18) of the type having a relatively broad base portion (20) extending upwardly from a seat portion (56) and a relatively narrow or reduced width headrest portion (28) extending upwardly from the top edge of the base portion (20), whereby a valley section (36) is formed between the top outer edges (30) of the headrest portion (28) and the top outer edges (34) of the base portion (20) with a backrest envelope (12), said method comprising the steps of:
inserting the backrest (18) within the backrest envelope (12);
bridging the valleys (36) on the backrest (18) with bridging portions of the backrest envelope (12) suspended across the valleys (36);
and characterized by pulling an adjustment device attached to the bridging portions to draw the bridging portions of the backrest envelope (12) toward the valleys (36) to snugly fit and conform the seat cover (10) into the valleys (36) of the backrest (18).

17. A method as set forth in claim 16 further characterized by attaching a pair of straps (46) to the backrest envelope (12) to facilitate pulling the backrest envelope (12) into the valleys (36) of the backrest (18).

* * * * *